(No Model.)

H. M. ASHLEY.
MACHINERY FOR MAKING GLASS BOTTLES, &c.

No. 403,024. Patented May 7, 1889.

Witnesses.

Inventor.
Howard Mathews Ashley.

UNITED STATES PATENT OFFICE.

HOWARD MATRAVERS ASHLEY, OF FERRYBRIDGE, COUNTY OF YORK, ENGLAND.

MACHINERY FOR MAKING GLASS BOTTLES, &c.

SPECIFICATION forming part of Letters Patent No. 403,024, dated May 7, 1889.

Original application filed September 26, 1887, Serial No. 250,767. Divided and this application filed November 10, 1888. Serial No. 290,507. (No model.) Patented in England March 7, 1887, No. 3,434; in Austria-Hungary September 19, 1887; in Belgium September 23, 1887; in France September 24, 1887; in Canada January 3, 1888, No. 28,296; in Italy February 17, 1888; in Norway March 2, 1888; in Victoria April 18, 1888; in New South Wales April 20, 1888; in Tasmania April 21, 1888; in Spain July 13, 1888, and in Portugal August 3, 1888.

*To all whom it may concern:*

Be it known that I, HOWARD MATRAVERS ASHLEY, a subject of the Queen of Great Britain and Ireland, and a resident of Ferrybridge, in the county of York, England, have invented a new and useful Improvement in Machinery for the Manufacture of Bottles and other Like Hollow Glassware, (patented to me in Great Britain and Ireland by Letters Patent No. 3,434, dated March 7, 1887; in Austria-Hungary by Letters Patent dated September 19, 1887; in Belgium by Letters Patent dated September 23, 1887; in France by Letters Patent dated September 24, 1887; in Canada by Letters Patent No. 28,296, dated January 3, 1888; in Italy by Letters Patent dated February 17, 1888; in Victoria by Letters Patent dated April 18, 1888; in New South Wales by Letters Patent dated April 20, 1888; in Tasmania by Letters Patent dated April 21, 1888; in Norway by Letters Patent dated March 2, 1888; in Spain by Letters Patent dated July 13, 1888, and in Portugal by Letters Patent dated August 3, 1888,) of which the following is a specification.

This invention relates to means for making bottles and like hollow glassware by machinery, so as to dispense with the harmful process of glass-blowing by mouth, and also to reduce the cost of manufacture.

In another specification forming part of a division of an application for United States Letters Patent, filed September 26, 1887, Serial No. 250,767, of which this also is a division, I have described and claimed a certain process for effecting the above-named object.

The present invention consists in peculiar apparatus primarily designed for carrying said process into effect, and comprising certain novel combinations of parts, hereinafter set forth and claimed.

A sheet of drawings accompanies this specification as part thereof.

Figure 1:
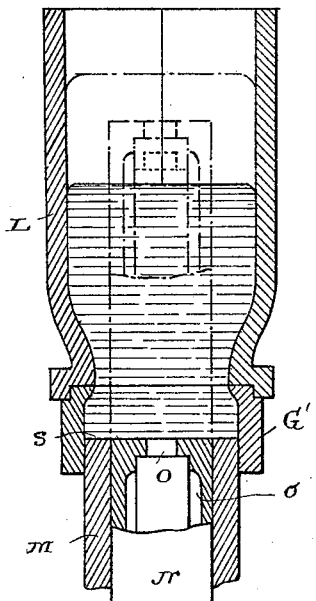
Figure 2:
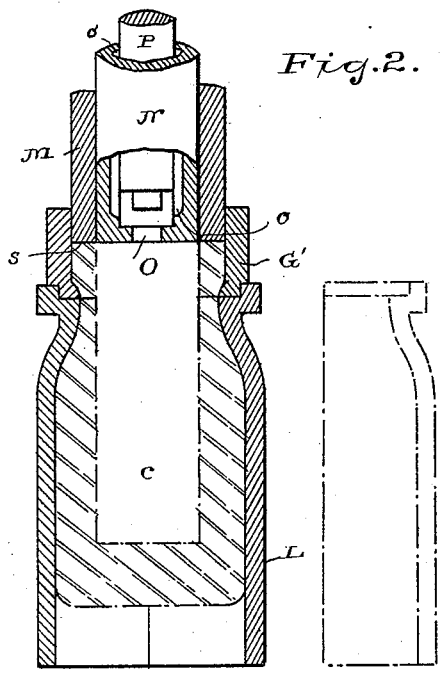
Figure 3:
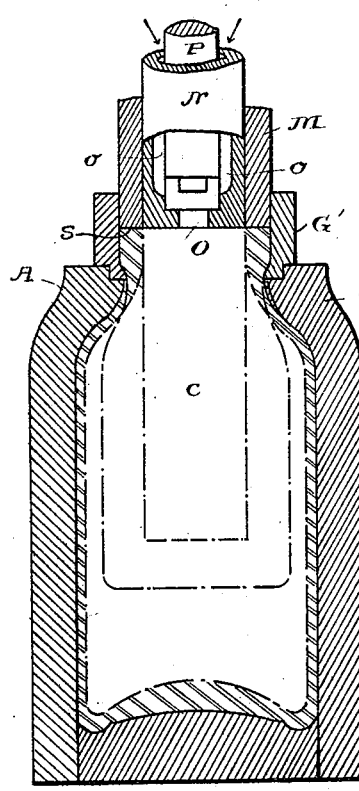

Figures 1 and 2 of the drawings represent sectional elevations of a "parison-mold," illustrating by full and dotted lines four positions of its parts. Fig. 3 is a sectional elevation of the same, as shown in Fig. 2, with an ordinary longitudinally-divided bottle-mold fitted to the head mold or collar of the parison-mold for finishing the bottle.

Like letters of reference indicate corresponding parts in the several figures.

For clearness I have confined the drawings and will confine the following description to molds for making bottles, and have omitted in the drawings details of frame-work and actuating devices, which form no part of this invention and will be readily supplied by machinists without further direction.

The first part of my aforesaid process, as illustrated by Fig. 1, consists in measuring the molten glass, casting a "parison" in inverted position with a head that is finished as to external shape, and forming an initial recess or cavity therein by punching upward into the parison while it is inverted and the molten glass is unconfined, in contradistinction to forming the head of the bottle by pressing or by spinning operations. This is preferably effected in a parison-mold, Figs. 1 and 2, having a longitudinally-divided hollow body or mold proper, L, which is removable from the punched parison by separating its parts after the mold is reverted, as illustrated by Fig. 2, the parison to be expanded by the direct pressure of a gaseous fluid, as air, to form the body of the bottle within a distinct shaping-mold, as illustrated by Fig. 3. In the said parison-mold, Figs. 1 and 2, the parts of the body-mold L coact with a head mold or collar, G', upon a tube, M, through which a hollow punch, N, works. This punch is made with a suitable opening, O, in its "face," which enters the mold, and an internal plug, P, is in the example fitted thereto. The stem of this plug extends longitudinally through the outer end of the punch, and serves as a means by which to force the punch forward into the glass within the mold to form the initial cavity c, and then to retract the punch. This movement is controlled by a stud-pin working in a slot in the punch N, and passages o in the punch connect the opening O with the interior of the tube M. When the required quantity of molten glass is run into the inverted mold, thereby casting a parison in inverted position, the punch N is forced upward into the same, its outlet-opening O being kept closed by the plug P; and on being retracted the first movement of the plug admits a gaseous fluid, as air, through the outlet-opening O into the cavity c, from which the punch is being withdrawn, so as to prevent a vacuum in the glass. The plug is shown at the end of its opening movement in dotted lines in Fig. 1.

In the act of casting the parison the head of the bottle is finished as to external shape, without the aid of any pressing or spinning operation, by means of a suitably-recessed head-mold or collar, G', and an annular surface, s, which is conveniently formed on the end of the tube M within the inner circumference of the collar. This surface shapes the outer face of the lip, and is readily given any required form by lathe-turning it. When the diameter of the neck of a bottle is to exceed the diameter of the head, a collar may be used made in one part; but for otherwise molding the head, as indicated in Figs. 1 and 2, a divided collar—such as is shown at G'—is required, and such divided collar preferably embraces a suitable nozzle, which is formed, for example, by the end of said tube M and provided with said surface s.

The parts of the body-mold L and those of the divided collar G' may be carried into and out of position by any approved means. Suitable slides for the purpose are shown at U and at H H² in the drawings, forming part of another companion case, (Serial No. 290,508, filed November 10, 1888.)

The diameter of the punch N is made suitable for the mouth of the bottle, and the glass cut out by the punch is carried bodily forward and left in the hotter part of the mass, where it soon recovers from the chilling contact of the punch and head-mold, while the mouth itself is sufficiently chilled to cause it to preserve the diameter so given to it. Bottles thus made are perfectly uniform as to size of mouth and shape of head or lip, which is frequently a great desideratum. When the parison is completed, the parison-mold is reversed and its body-mold L is then opened, as illustrated by Fig. 2. The parison, suspended by the collar G', is next inclosed in a bottle-mold, A, Fig. 3, of any approved shape and construction, simply fitted to the collar in the same manner, for example, as the body-mold L. The neck end of the mold is closed by the head of the parison and the collar G' encircling the same.

Any suitable gaseous fluid, as air, steam, or gas under pressure, may now be admitted through the punch N into the cavity c of the parison, so as to blow the same into a finished bottle within the mold A, as set forth in a companion case; or the air may be exhausted from the space around the parison in the bottle-mold, as set forth in another companion case. Finally, the bottle-mold A and the collar G' are opened, and the released bottle is removed to the annealing-oven, as is customary. The collar and punch are then inverted again, and the parison body-mold L is closed upon the collar, ready to receive another charge of molten glass, as in Fig. 1.

Suitable means for simultaneously inverting and reverting the parts of the parison-mold are set forth in said companion case No. 290,508, which also sets forth suitable means for preserving a connection between the interior of the punch and an air-pump or other apparatus supplying a gaseous fluid under pressure or for connecting the exterior of the mold with suitable exhausting apparatus.

In order that the molten glass, when required for use, may be of equal temperature throughout, I preferably scoop up a sufficient quantity of glass from the tank with a crucible or like vessel of plumbago, or other material that is a slow conductor of heat, and which has been previously heated to the temperature of the glass, so as to prevent chilling the same. After the externally-adhering glass has drained back into the tank the vessel is taken from the furnace and the molten glass is poured therefrom into the molds, as required. While the vessel is so draining, the glass within it recovers from any disturbance or variation of its temperature and fluidity due to removing it from the tank, and uniformity of thickness in the molded article is thus insured.

At any part of the mold where the glass would be likely to cool too rapidly from any cause I arrange that the flames from one or more gas-burners shall impinge upon such parts so as to retain it at the required temperature.

Details of construction and procedure which have not been specified may be of any approved description.

I do not claim herein the process of measuring the molten glass, casting a parison in inverted position with a head that is finished as to external shape, forming an initial recess or cavity therein by punching upward into the parison while it is inverted and the molten glass is unconfined, and finally expanding the body of the article within a shaping-mold by the direct pressure of a gaseous fluid, as air; nor the process of measuring the glass and forming an initial recess or cavity therein by punching and causing the same to be expanded within a shaping-mold by atmospheric pressure within said cavity, by exhausting the air from around said mold, nor any of the steps of such processes; nor the above-described process of handling the molten glass preparatory to the parison-casting operation. These inventions are claimed in said original application and divisions thereof, serially numbered 290,506 and 290,510, filed November 10, 1888. Neither do I limit my claims, hereinafter stated, to bottle-molds, to which the drawings and description have been confined for greater clearness, as aforesaid, nor to details of construction not essential to the respective combinations of parts.

Having thus described said improvement in machinery as a whole, I claim as my invention and desire to patent under this specification—

1. In machinery for making bottles and other like articles of hollow glassware, the combination, with a suitable mold which receives the molten glass, of a hollow punch adapted to be thrust endwise into the glass and immediately withdrawn therefrom to provide the glass with an initial cavity, and having an opening to admit a gaseous fluid, as air, into such cavity while the punch is being retracted, substantially as hereinbefore specified.

2. In machinery for making bottles and other like articles of hollow glassware, the combination, with a suitable mold, of a hollow punch adapted to be thrust endwise into the mold and withdrawn therefrom and having an outlet-opening, and suitable means, as a plug, for closing said opening when the punch is thrust in, substantially as hereinbefore specified.

3. In machinery for making bottles and other like articles of hollow glassware, the combination, with a suitable mold, of a hollow punch adapted to be thrust endwise into the mold and withdrawn therefrom and having an outlet-opening in its face, and a plug within said punch fitted to said opening for closing it and having a stem which projects rearwardly through the punch as means for operating both, said plug and punch being connected by a suitable lost-motion device, as a lateral pin and longitudinal slot, substantially as hereinbefore specified.

4. In machinery for making bottles and other like articles of hollow glassware, the combination, substantially as hereinbefore specified, of an invertible mold which receives the molten glass in its inverted position, and a punch at the neck end of the mold adapted to be thrust upward into the inverted mold to provide the molten glass with an initial cavity.

5. In machinery for making bottles and other like articles of hollow glassware, the combination of an invertible mold comprising a body-mold and a distinct head-mold or collar at the neck end of said body-mold, and a punch movable upwardly through said collar into the body-mold, substantially as hereinbefore specified.

6. In machinery for making bottles and other like articles of hollow glassware, the combination of an invertible mold comprising a body-mold and a head-mold or collar at the neck end of said body-mold, a nozzle within said collar, and a punch of substantially the required mouth-diameter, adapted to be thrust upward into the body-mold and withdrawn therefrom, substantially as hereinbefore specified.

7. In machinery for making bottles and other like articles of hollow glassware, the combination of an invertible mold comprising a longitudinally-divided body-mold and a divided head-mold or collar fitted to the neck end of said body-mold, a nozzle within said collar, and a punch fitted to said nozzle and adapted to be thrust upward into the body-mold and withdrawn therefrom, substantially as hereinbefore specified.

8. In machinery for making bottles and other like articles of hollow glassware, the combination, with an invertible mold comprising a longitudinally-divided body-mold and a divided head-mold or collar fitted to the neck end of said body-mold, of a hollow punch adapted to be thrust upward through said collar into said body-mold and having an outlet-opening at its face end, and a conduit supplied with a gaseous fluid, as air, under pressure, in communication with the interior of said punch, substantially as hereinbefore specified.

9. In machinery for making bottles and other like articles of hollow glassware, the combination, with a suitable head-mold or collar for molding the head of the bottle on a cast parison in inverted position, of a nozzle fitted thereto and having at its top in its inverted position an annular surface which shapes the outer face of the lip, substantially as hereinbefore specified.

HOWARD MATRAVERS ASHLEY.

Witnesses:
FRANCIS FORBES,
JAS. L. EWIN.